Figure 3:
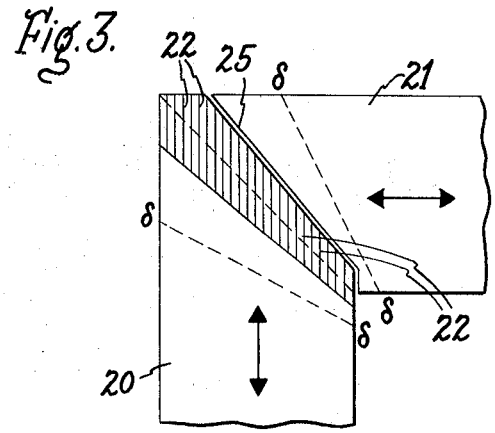

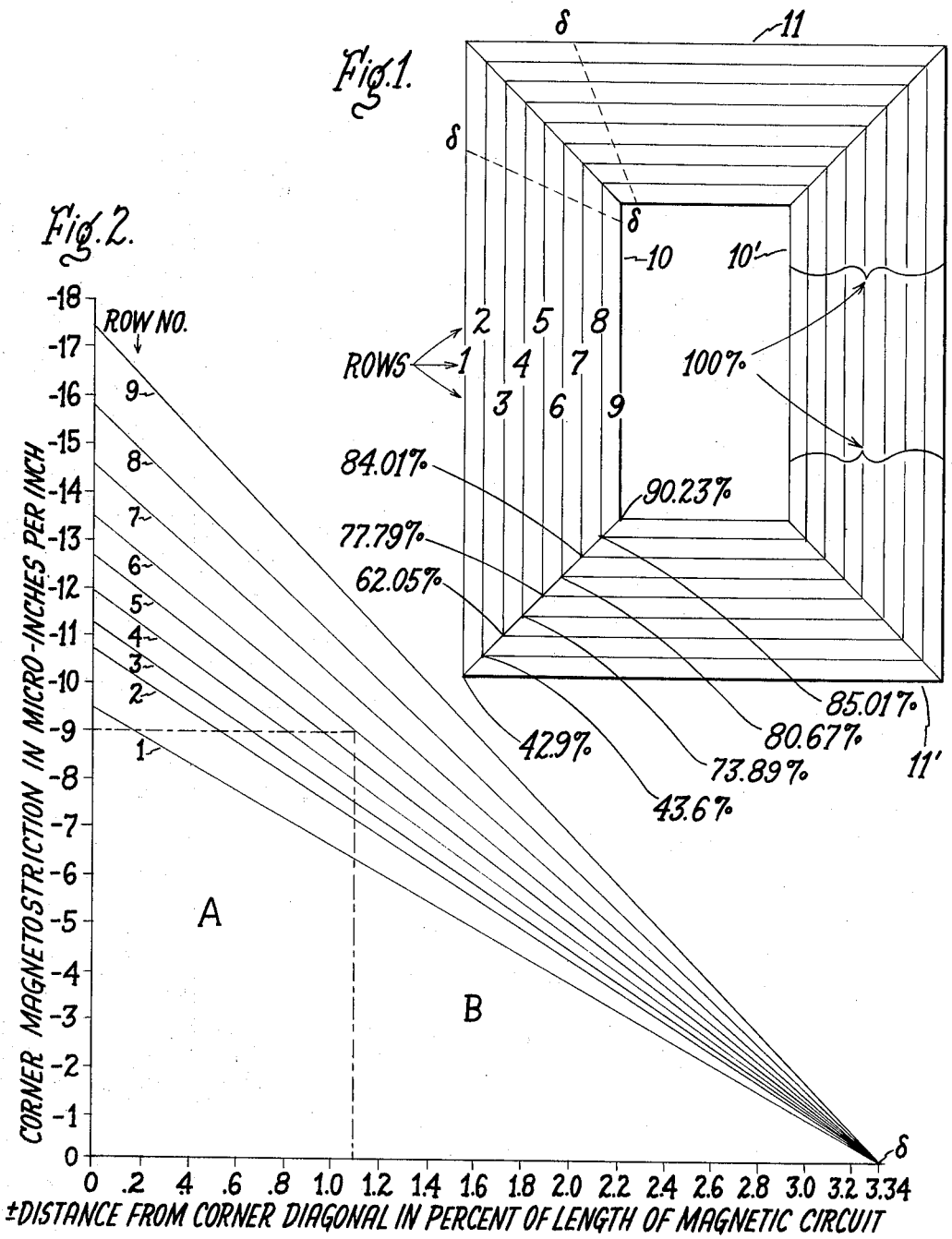

May 17, 1966  D. C. GRAHAM  3,252,119
STATIONARY INDUCTION APPARATUS
Filed July 26, 1962  3 Sheets-Sheet 2

Inventor,
Donald C. Graham,
by Gilbert P. Tarleton
His Attorney.

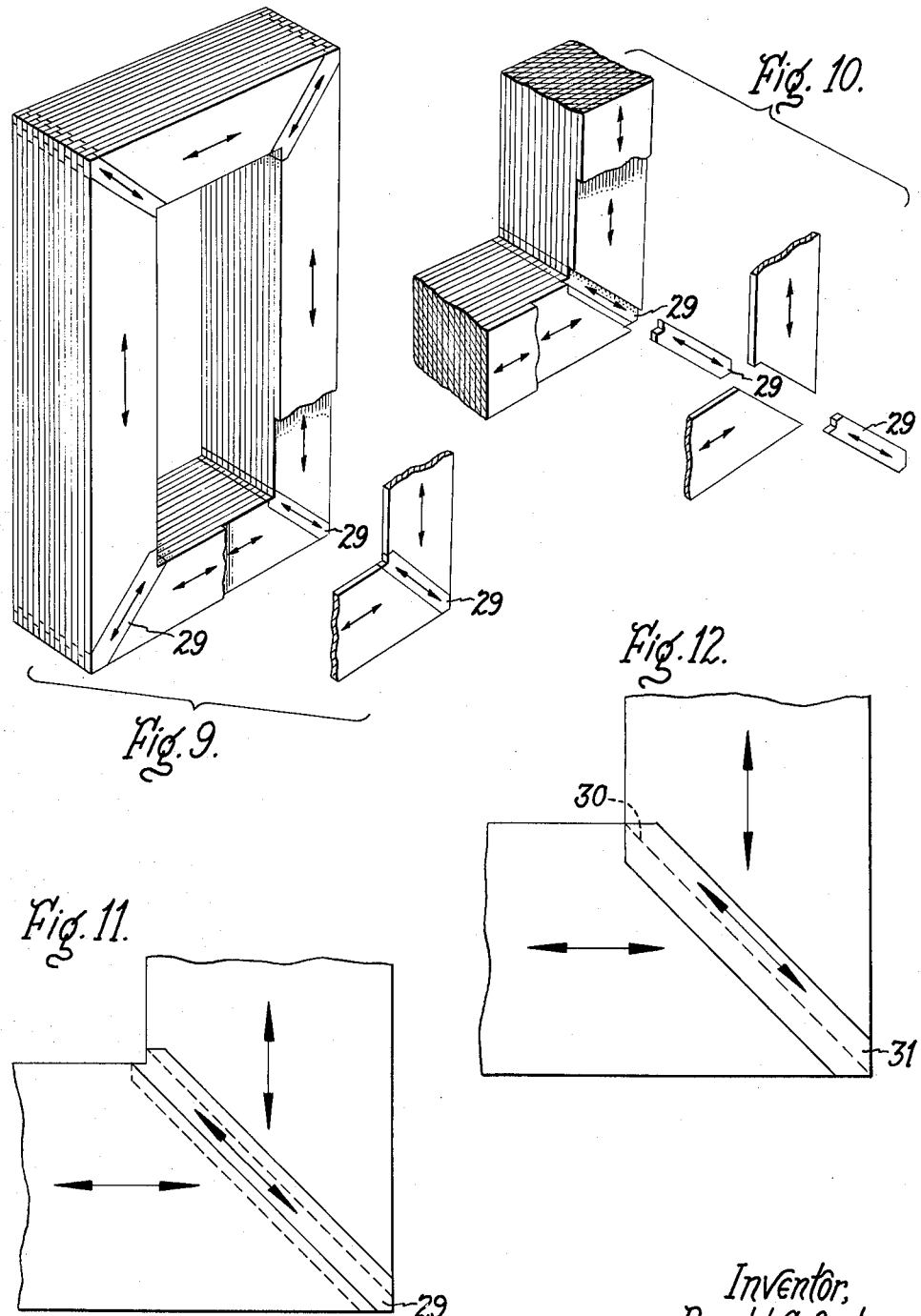

United States Patent Office 3,252,119
Patented May 17, 1966

3,252,119
STATIONARY INDUCTION APPARATUS
Donald C. Graham, Pittsfield, Mass., assignor to General Electric Company, a corporation of New York
Filed July 26, 1962, Ser. No. 212,632
8 Claims. (Cl. 336—217)

This invention relates to stationary induction apparatus and more particularly to improvements in mitered joints in transformer cores.

Mitered joints are used principally in plate cores built up of flat laminations of so-called singly oriented magnetic material having a most favorable magnetic direction coinciding with the normal direction of magnetic flux therein. This direction normally corresponds to the lengthwise dimension of the lamination pieces. Typical material of this kind is high reduction cold rolled silicon alloy steel in which the most favorable magnetic direction corresponds with the rolling direction.

The mitered joints are between adjoining ends of coplanar lamination pieces whose lengthwise dimensions are at an angle to each other. Typically the pieces are perpendicularly related so-called leg and yoke laminations of a rectangular core. The angle of the mitered joint is typically half the angle between the pieces it joins thus being forty-five degrees to the lengthwise dimension of perpendicularly related leg and yoke laminations. In other words, such joints are generally parallel with a corner diagonal of the core. While the joints in each layer are generally similar they are typically offset slightly from the diagonal in opposite directions in adjacent layers so as to provide an overlapped joint which has lower reluctance than a butt joint which is what would result if the joints in each layer were all on the corner diagonal.

The reason for mitered joints lies in the anisotropic character of the magnetic material. In other words, their purpose is to optimize the utilization of the most favorable magnetic direction of the material. Ideally the magnetic flux in each lamination piece will stay parallel to the most favorable magnetic direction until the joint or corner diagonal is reached at which point it will abruptly change direction in the joint by the angle between the joined pieces. Thus there will be no flux in the pieces themselves which is at an angle to their most favorable magnetic direction.

However, I have discovered that not only does the corner flux actually deviate more widely from its idealized pattern than was previously supposed, but that such actual deviation in combination with other anisotropic properties of the material which are critically sensitive to such actual deviation is a potent cause of noise produced by such apparatus.

By other anisotropic properties of the material is meant particularly magnetostriction which is the per unit change in the dimensions of the magnetic material with changes in flux or flux density in it. In singly oriented material with flux at some angle (i.e. not parallel) to the rolling direction, the magnetostriction in the rolling directon decreases (i.e. becomes less positive and even becomes negative depending on the angle and the magnitude of the magnetostriction when flux is in the rolling direction) and increases half that amount in the two directions at right angles to the rolling direction to maintain constant volume. Furthermore, the magnetostriction is sensitive to or varies with applied stress in the material.

The fundamental reason the corner flux deviates from the above described ideal pattern is that as all the paths of the individual flux lines are magnetically in parallel and have a common magnetizing force, the reluctance drops of their individual paths must be the same. However, reluctance in a function of the length of a magnetic circuit and the length of the magnetic circuits or paths of the individual flux lines varies considerably from the inner side to the outer side of the core depending on the width of the lamination pieces. The result is what is called crowding of the flux at the inner side of the corner. This variation in flux density equalizes the reluctance drop of the paths of the individual flux lines in two ways. It increases the reluctance drop of the shorter inner paths by raising their flux density (saturation effect) and it decreases the reluctance drop of the longer outer paths by decreasing their length due to the flux taking a short cut around the corner instead of continuing in a straight line to the diagonal.

I have discovered that this corner flux crowding effect produces unequal negative magnetostrictive strain in the material at different points along the corner diagonal thus producing a force couple or bending moment on the straight limbs of the core which creates additional strains in them thus materially affecting their magnetostriction and in some cases the flux pattern in the core and that these effects cause about half the sound intensity of the noise produced by such cores.

In accordance with this invention, I have devised novel modifications of mitered joints which reduce the sound intensity of the noise produced by their cores to about half. Broadly speaking, I do this by providing within the corner region and as part of the mitered joint an intermediate section of magnetizable material which exhibits a positive magnetostrictive characteristic in the corner region of sufficient magnitude to substantially cancel or neutralize the negative magnetostriction in the other sections of the corner region, thereby substantially to eliminate the force couple or bending moment which causes the excessive noise. This positive magnetostriction may be provided by either modifying the magnetostrictive properties of terminal sections of the laminations themselves or by employing special magnetic inserts between the ends of the main leg and yoke lamination pieces. Furthermore, the modified joints can either preserve the inner corner flux crowding pattern in the joint region or change it toward the idealized uniform flux density pattern thus requiring the introduction of less corrective positive magnetostriction.

An object of the invention is to provide a new and improved magnetic core for stationary induction apparatus.

Another object of the invention is to provide a new and improved mitered joint for such cores.

A further object of the invention is to reduce the noise produced by mitered joint magnetic cores.

The invention will be better understood from the following description taken in connection with the accompanying drawings and its scope will be pointed out in the appended claims.

In the drawings,

FIG. 1 illustrates a rectangular mitered joint core with all the joints on their respective corner diagonals.

Figure 4:
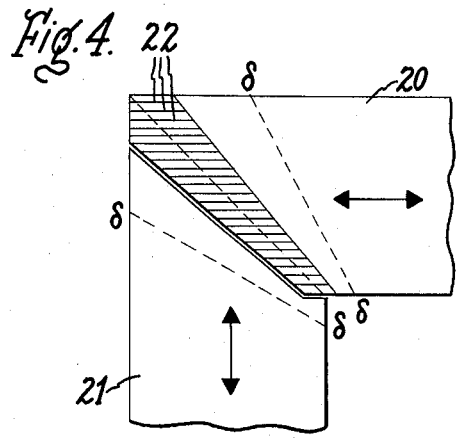
Figure 5:
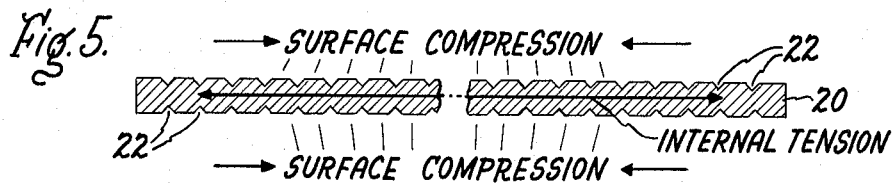
Figure 6:
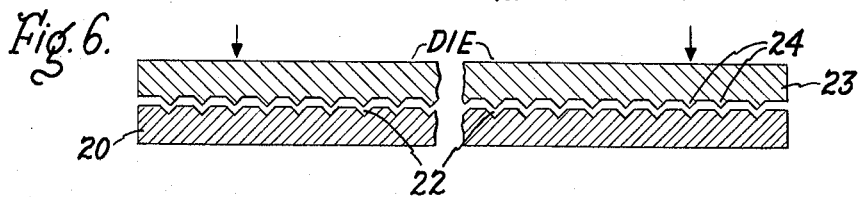
Figure 7:
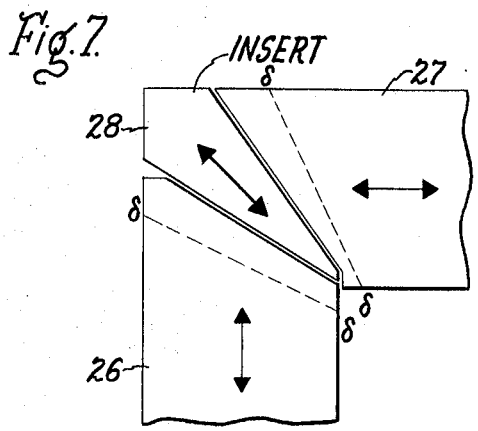
Figure 8:
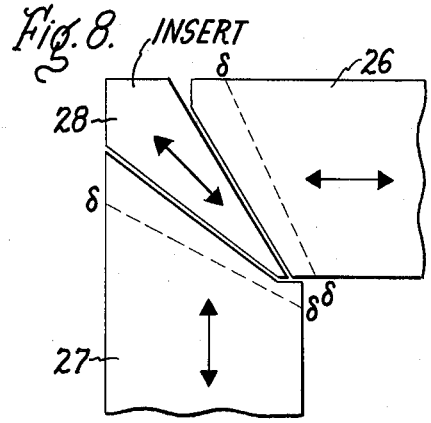

FIG. 2 is a graph showing the amount of negative magnetostriction in the corner regions in terms of distance from the corner diagonals, FIGS. 3 and 4 illustrate respectively alternate layers of a core having a mitered joint in accordance with one form of the present invention, FIG. 5 is an end view of one of the lamination pieces at the mitered joint of FIGS. 3 and 4, FIG. 6 illustrates an apparatus for producing the modified lamination structure shown in FIG. 5, FIGS. 7 and 8 illustrate respectively alternate layers of a modified form of the present invention employing special insert pieces rather than specially treated lamination pieces of FIGS. 3 and 4, FIG. 9 is a partly broken away perspective view of another modification of the invention employing magnetic inserts of constant width which materially alter the flux pattern in the direction of uniform flux density, FIG. 10 is a slightly enlarged detailed view of the modification shown in FIG. 9 with the parts further broken away and exploded to show the details in the three outermost layers of the core, FIG. 11 is a plan view of the joint shown in FIGS. 9 and 10 with the top layer or odd numbered layers shown by solid lines and the second or even numbered layers shown by dashed lines, FIG. 12 is an additional modification along the general lines of FIGS. 9–11 inclusive, but with alternate layers having plain 45° mitered joints sandwiched between layers having uniform width inserts.

Referring now to the drawings and more particularly to FIG. 1, there is shown therein a lamination layer of a rectangular core having mitered joints extending along the diagonals of the corner. As shown the layer consists of lamination pieces 10 and 10' which may be identical leg pieces and lamination pieces 11 and 11' which may be identical yoke pieces. Their ends have been cut on a 45° bias or bevel to produce the four right angle corners. As shown the core has been considered to have nine equally spaced zones or rows indicated by the lines numbered 1 through 9, respectively, row 1 being the outside edge of the core and row 9 being the inside edge of the core.

As has previously been explained, the lamination pieces 10, 10', 11 and 11' are made of singly oriented magnetic material having a most favorable magnetic direction corresponding with their lengthwise dimension, i.e. corresponding with the direction of the row lines 1 to 9, inclusive.

Studies of such a core under conditions when the main or center portions of the lamination pieces are carrying flux at a uniform density of 100% reveals that along the joint diagonals the flux density is far from uniform. For example, as indicated in FIG. 1, the flux density at the outer end of the diagonal in row 1 is 42.9%, the flux density at the center point of the diagonal, i.e. at the intersection of line 5 and the diagonal, the flux density is 77.79%, and at the inner corner of the joint on line 9 is 90.23%. The flux densities at the intermediate points being indicated in FIG. 1. The reason, of course, that the average flux density along a diagonal is less than 100% is because the cross-sectional area of the core at the joint corresponding to the length of the diagonal is materially greater than the cross-sectional area of the core corresponding to the width of the lamination pieces.

The non-uniformity of the flux density at different points along the corner diagonal indicated by the above figures is a quantitative measure of the crowding effect of the flux at the inner corners of the core. This result can only be obtained if the flux in crowding the inner corner takes a direction which is at an angle to the most favorable magnetic direction of the material of which the laminations are composed. This angular deviation of the flux has been confirmed by actual flux plots which among other things show that at the inner lines or rows such as numbers 8 and 9 the flux at first deviates from parallel to the most favorable magnetic direction by bending outwardly and then passes through a point of inflection and bends inwardly around the corner. Actually the direction of flux at any point on the diagonal is substantially perpendicular to the diagonal or, in other words, is at an angle of about 45° to the most favorable magnetic direction of the material of which the laminations are composed.

The effect of this angular relation between the direction of flux and the most favorable magnetic direction of the material in the corner region on magnetostriction of the material is shown approximately in FIG. 2 in which corner magnetostriction in micro inches per inch length of material is plotted against distance from the corner diagonal in percent of length of magnetic circuit at 100 kilo lines per square inch flux density in the core away from the corner region.

The nine numbered sloping lines in FIG. 2 represent conditions in the corner region for each of the nine numbered zones or rows in FIG. 1. Zero distance on the horizontal scale corresponds to the diagonal itself, that is to say zero distance from the diagonal. It will be observed that all nine lines converge or intersect at a point which is 3.34% of the length of the magnetic circuit at which point the corner effect magnetostriction is zero. This point may be designated by the symbol $\delta$ which is represented in the upper left-hand joint of FIG. 1 by the outwardly diverging straight lines on opposite sides of the diagonal. Thus for any of the nine rows or zones in FIG. 1 the distance along each of these numbered lines from the diagonal to the sloping lines designated $\delta$ divided by the total length of the magnetic circuit for that line or zone is a constant. Thus the acutely diverging oblique lines labeled $\delta$ in FIG. 1 represent cross-sectional planes which define the limits of the corner region, i.e. outside these planes the flux is essentially parallel to the most favorable magnetic direction whereas between these planes the flux direction makes an angle with the most favorable magnetic direction of the material and it is this angular relationship which causes the magnetostriction in the rolling direction to be more negative as indicated in FIG. 2. By negative magnetostriction in any direction is meant that the material shortens rather than lengthens in that direction as the magnetic flux in it increases.

Further reference to FIG. 2 shows that the negative magnetostriction in each of the nine zones is a maximum at the diagonal, i.e. magnetostriction introduced into the central zone or portion of the corner region may be made to cancel from the most favorable magnetic direction of the magnetic material. Furthermore, it will be observed that at the diagonal the greatest negative magnetostriction occurs in the innermost zone number 9 where the flux density is the highest and that the negative magnetostriction progressively decreases in going outwardly from zone to zone which also corresponds to the progressive decrease in flux density at these points. FIG. 2 also shows that as the distance from the diagonal increases in the direction of the most favorable magnetic direction of the material that the negative magnetostriction progressively decreases throughout the corner region until the limit of the corner region is reached at the point corresponding to $\delta$.

The mechanical strains produced in the core by the unequal negative magnetostriction along the corner diagonals produce force couples or bending moments in the limbs of the core represented by the legs 10–10' and 11–11', thus altering the magnetostriction in them outside the corner region with the result that such cores are substantially noisier than they otherwise would be, the noise, of course, being produced by the normally 120 cycle per second (and harmonics thereof) minute changes in the dimensions of the laminations which produce air or sound waves of the same frequency resulting in the well-known transformer hum.

Referring now to FIG. 3 this is a view at the corner of a core having a mitered joint modified in accordance with one form of the invention. In this figure the end of a lamination piece 20 has its beveled or bias cut end extended beyond the corner diagonal, indicated by the dashed line, and the beveled or mitered cut end of the adjoining lamination piece 21 is located short of the corner diagonal. The end of the piece 20 on both sides of the diagonal has been abraded by pressing a series of parallel grooves 22 into one or both of its flat faces, the grooves extending parallel to the rolling direction or most favorable magnetic direction as indicated by the double headed arrow on the piece 20. Thus in cross-section the grooved or abraded end of the lamination piece 20 would be as shown in FIG. 5. Pressing grooves in the surface of the lamination piece 20 causes the surface material to flow outwardly away from the grooves thus putting the surface of the abraded end of the lamination piece 20 in compression crosswise of the lamination. This creates internal crosswise tension in the lamination piece 20 as indicated by the double headed arrow labeled "Internal Tension" in FIG. 5.

The grooves 22 may be formed in the lamination piece 20 in any suitable manner such as by a die 23, having parallel ridges 24, which is pressed into lamination piece 20, or by scribing, abrading, etc.

As is now well known, the effect of abrading the surface of oriented magnetic steel strip or sheet material is to change its magnetostriction. By placing the interior of the lamination piece under crosswise internal tension in a zone on opposite sides of the diagonal falling within the corner region defined by δ, any predetermined positive amount of magnetostriction may be introduced into the mitered joint. By properly proportioning the length of the grooves the amount of positive magnetostriction introduced into the intermediate zone or section of the corner region may be made to cancel or neutralize negative magnetostriction in the adjacent-spaced apart leg and yoke portions constituting the remainder of the corner region, so that in effect a negligible net magnetostrictive strain or bending moment force couple is produced in the limbs of the core.

FIG. 4 is the same as FIG. 3 except that the parts have been reversed so that the lamination piece 20 with the abraded end is the horizontal piece instead of the vertical piece. In an actual core, FIGS. 3 and 4 will be superposed in alternate layers so that if FIG. 3 represents the odd numbered layers, FIG. 4 represents the even numbered layers or vice versa. In this manner, the actual abutting joint 25 between the ends of the lamination pieces 20 and 21 are overlapped or offset alternately on opposite sides of the diagonal.

The width of the abraded end of the extended lamination piece 20 perpendicular to the diagonal may be determined for any particular material by graphical methods such as indicated in FIG. 2, wherein the rectangle A represents positive magnetostriction and the area to the right of A under the sloping line 5 represents negative magnetostriction, which area is designated B. By selecting the proper points for the height and width of A, the areas A and B may be equalized thus equalizing the positive and negative magnetostriction. This works out so that the width of the abraded intermediate section is approximately one-third of δ which accounts for the tapering width of the abraded section.

Referring now to FIG. 7, this illustrates a modification representing another way of introducing positive magnetostriction into the joint in a central portion of the corner region defined by δ. This comprises beveling or bias cutting the ends of perpendicular lamination pieces 26 and 27 short of the diagonal but within the corner region δ, and inserting therein in the space provided between those ends a magnetic insert piece 28 of the same material from which the lamination pieces 26 and 27 are made, but with its most favorable magnetic direction or rolling direction substantially parallel with the diagonal as indicated by the double headed arrow thereon.

FIG. 8 is in effect FIG. 7 reversed and the insert in FIG. 8 is identical with the insert in FIG. 7 except that it is turned over or reversed. By reason of the inner corner notches in the pieces 27 and the configuration of the inner end of the insert 28, the super-position of the layers indicated by FIGS. 7 and 8 will produce an overlap joint.

Inasmuch as the flux in the insert 28 is substantially at right angles to the rolling or most favorable magnetic direction of the insert its magnetostriction in that direction is negative, so that the magnetostrictive strain produced by the insert will be positive in the rolling directions of the perpendicular leg and yoke pieces. This effect counteracts or neutralizes the negative magnetostriction in the remaining portion of the corner region defined by δ and outside of the insert 28. The width of the magnetic insert may be determined in the same manner as the width of the abraded ends of the laminations in FIGS. 3 and 4.

In the species of FIGS. 3–4 the width of the abraded section and in the modification of FIGS. 7–8 the width of the magnetic inserts is the same percentage of the length of the magnetic circuit for each of the flux paths of the core. Therefore the flux pattern in the corner region is not changed materially from that indicated on FIG. 1 and the flux still tends to crowd the inner corner of the core.

Referring now to FIG. 9 there is shown therein a laminated core having uniform width corner insert pieces 29, the pieces being reversed or rotated 180° on an axis corresponding to the corner diagonal in successive layers and the pieces being unsymmetrical with respect to the corner diagonal so as to provide overlaps of the joints in successive layers as indicated most clearly by the overlaps between the solid and dashed lines in FIG. 11. The rolling or most favorable magnetic direction of the material constituting the main leg and yoke laminations and the magnetic inserts 29 is shown by the double headed arrows thereon and it will be seen that in the inserts the most favorable magnetic direction corresponds generally to the direction of the corner diagonal.

Because the magnetic flux in the core passes through the inserts generally perpendicularly to the most favorable magentic direction of the inserts the specific reluctance or reluctance per unit distance in direction of flux travel is very substantially higher than in the main body of the core represented by the main leg and yoke laminations. As the inserts are of uniform width instead of being tapered as in FIGS. 7–8, the reluctance of the magnetic inserts in FIGS. 9–10 and 11 is substantially higher for the inner flux paths of the core than for the outer flux paths of the core because obviously the width of these inserts is a substantially greater proportion of the total length of the inner magnetic paths than it is of the longer outer magnetic paths. Consequently, there is less tendency for the flux to crowd the inner corner because the reluctance of the inner paths is not as much less than the reluctance of the outer paths in the preceding figures. Therefore, there is not so much negative magnetostriction to be compensated in FIGS. 9, 10 and 11 as in the previous species, and for this reason the insert 29 is not required to produce as much positive compensating magnetostriction as in the previous figures. Tests on a core having main lamination pieces 4" wide have given good results with inserts 29 one-half inch wide, this one-half inch dimension, of course, being measured perpendicular to the direction of the corner diagonal, i.e. perpendicular to the most favorable magnetic direction or rolling direction of the inserts 29.

Referring now to FIG. 12, this illustrates another modification somewhat similar to that of FIGS. 9, 10 and 11 except that alternate layers have no insert but have straight mitered joints 30 similar to those shown in FIG. 1 whereas the other layers have equal width inserts 31 which can then be symmetrical relative to the corner diagonal in that they need not be reversed because the required overlap is between the inserts 31 and the straight mitered joints 30 in the alternate layers. Another difference between the inserts 31 and the inserts 29 of FIG. 9 is that at the inner corner of the core both the main laminations are notched and the insert is cut to form a point whose sides fit the notches of the main laminations. The purpose of this is to prevent introducing so much increased reluctance into the inner magnetic paths of the core as to cause the flux in the inner paths to actually tend to bow outwardly toward the outer corner of the core. Thus in FIG. 12 the flux in the inner flux paths of the core can continue in a straight line parallel to the most favorable magnetic direction right up to the insert and cross the joint at the insert without going at an angle to the most favorable magnetic direction.

Because there is an insert 31 on each side, that is, above and below each straight mitered joint 30, the flux pattern in the layers having straight mitered joints 30 will not be the same as is indicated for FIG. 1 because when the flux in the layers having the straight mitered joints 30 approaches the angle to the rolling direction of maximum reluctance which for singly oriented material is about 55°, such flux will be offered the choice of going to either side and entering the inserts where the direction of travel will be more nearly 90° to the most favorable direction in which case the reluctance will be substantially less than for the maximum reluctance angle. However, as positive compensating magnetostriction is only introduced into alternate layers in FIG. 12 by means of the laminations 31 in alternate layers, the width of these inserts should be somewhat greater than the width of the inserts in FIGS. 9, 10 and 11. For example, in a core having main laminations 4″ wide, the width of the inserts 31 perpendicular to the corner diagonal should be greater than one-half inch and more of the order of three-quarters inch to one inch.

While there have been shown and described particular embodiments of the invention, it will be obvious to those skilled in the art that changes and modifications may be made without departing from the invention and, therefore, it is intended by the appended claims to cover all such changes and modifications as fall within the true spirit and scope of the invention.

What I claim as new and desire to secure by Letters Patent of the United States is:

1. A multiple layer laminated magnetic core adapted for excitation by alternating current comprising relatively angularly disposed cooperating leg and yoke pieces in each layer formed of anisotropic magnetizable material having a most favorable direction of magnetization, said leg and yoke pieces being magnetically and mechanically coupled together at a corner region and each being formed with its most favorable direction of magnetization in the direction of its length, said corner region being bisected by a corner diagonal and being defined at opposite sides of said diagonal acutely diverging oblique cross sectional planes beyond which magnetic flux in said legend yoke pieces is essentially parallel to the lengthwise directions of the respective pieces, the several lamination layers of said leg and yoke pieces being joined within said corner region by mitered butt joints at opposite sides of said corner diagonal, each said layer including at least one such joint and the central portion of said corner region between each of said butt joints being formed of magnetically anisotropic material having positive magnetostrictive effects in the lengthwise directions of both said leg and yoke pieces, whereby nonparallelism between said lengthwise directions and magnetic flux in marginal portions of said corner region creates compensatory negative magnetostrictive action within said region to minimize core noise.

2. A multiple layer laminated magnetic core adapted for excitation by alternating current comprising relatively perpendicularly disposed cooperating leg and yoke pieces in each layer formed of anisotropic magnetizable material having a most favorable direction of magnetization, said leg and yoke pieces being magnetically and mechanically coupled together at a corner region and each being formed with its most favorable direction of magnetization in the direction of its length, said corner region being bisected by a corner diagonal and being defined at opposite sides of said diagonal acutely diverging oblique cross sectional planes beyond which magnetic flux in said leg and yoke pieces is essentially parallel to the lengthwise directions of the respective pieces, said leg and yoke pieces in adjacent layers of said core abutting at mitered joints within said corner region and oppositely offset from said corner diagonal thereby to overlap the leg and yoke pieces of adjacent layers in a central portion of said corner region, the overlapping ends of said leg and yoke pieces in said central portion being grooved longitudinally on the surface to provide internal tension in said ends.

3. A multiple layer laminated magnetic core adapted for excitation by alternating current comprising relatively perpendicularly disposed cooperating leg and yoke pieces in each layer formed of anisotropic magnetizable material having a most favorable direction of magnetization, said leg and yoke pieces being magnetically and mechanically coupled together at a corner region and each being formed with its most favorable direction of magnetization in the direction of its length, said corner region being bisected by a corner diagonal and being defined at opposite sides of said corner diagonal by acutely diverging oblique cross sectional planes beyond which magnetic flux in said leg and yoke pieces is essentially parallel to the lengthwise directions of the respective pieces, and an insert of anisotropic magnetizable material interposed between spaced apart ends of said leg and yoke pieces in at least alternate core layers and disposed symmetrically along said corner diagonal and within said corner region, said insert being smaller than said corner region and having its most favorable direction of magnetization oriented along the line of said corner diagonal.

4. A multple layer laminated magnetic core adapted for excitation by alternating current comprising relatively perpendicularly disposed cooperating leg and yoke pieces in each layer formed of anisotropic magnetizable material having a most favorable direction of magnetization, said leg and yoke pieces being magnetically and mechanically coupled together at a corner region and each being formed with its most favorable direction of magnetization in the direction of its length, said corner region being bisected by a corner diagonal and being defined at opposite sides in said diagonal by acutely diverging oblique cross sectional planes beyond which magnetic flux in said leg and yoke pieces is essentially parallel to the lengthwise directions of the respective pieces, alternate coplanar layers of said core forming mitered butt joints directly between said leg and yoke pieces along said corner diagonal, and a laminar insert of anisotropic magnetizable material interposed between said leg and yoke pieces and along said corner diagonal in intermediate coplanar layers of said core, said insert being smaller than said corner region and having a most favorable magnetic direction parallel to said diagonal.

5. A core as defined in claim 1 in which said central portion of said corner region is inwardly tapered along the corner diagonal whereby the corner flux distribution along the corner diagonal is not appreciably disturbed by said central portion.

6. A core as defined in claim 1 in which said central portion of said corner region comprises a discrete insert of laminated magnetizable material oriented with its most favorable magnetic direction along the line of said corner diagonal and formed with alternate layers oppositely asymmetrically disposed with respect to said diagonal to provide overlapping mitered joints with the adjacent leg and yoke pieces.

7. A core as defined in claim 1 in which said central portion of said corner region comprises a discrete wedge-shaped insert of anisotropic magnetizable material oriented with its most favorable magnetic direction along the line of said corner diagonal and having a width diminishing from the outer toward the inner ends of said diagonal.

8. A core as defined in claim 1 in which said central portion of said corner region comprises a discrete insert of anisotropic magnetizable material having a substantially constant width and oriented with its most favorable magnetic direction along the line of said corner diagonal.

(References on following page)

References Cited by the Examiner

UNITED STATES PATENTS

| | | | |
|---|---|---|---|
| 2,234,968 | 3/1941 | Hayes et al. | 336—100 |
| 2,560,003 | 7/1951 | Sealey | 336—218 |
| 2,594,001 | 4/1952 | Ellis et al. | 336—218 X |
| 2,628,273 | 2/1953 | Somerville | 336—218 X |
| 2,912,660 | 11/1959 | Graham | 336—218 X |
| 3,076,160 | 1/1963 | Daniels | 336—218 |

FOREIGN PATENTS 1,126,338  7/1956  France.

LARAMIE E. ASKIN, *Primary Examiner.*

JOHN F. BURNS, *Examiner.*

W. M. ASBURY, *Assistant Examiner.*